(12) United States Patent
Sellers et al.

(10) Patent No.: US 8,047,739 B2
(45) Date of Patent: Nov. 1, 2011

(54) METAL SPLIT BEARING COMPRESSION LOAD BALL JOINT

(75) Inventors: Roger G. Sellers, Arnold, MO (US); Glen C. Parker, St. Peters, MO (US); Thomas J. Byrnes, St. Charles, MO (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 4 days.

(21) Appl. No.: 10/813,242

(22) Filed: Mar. 30, 2004

(65) Prior Publication Data
US 2005/0220531 A1    Oct. 6, 2005

(51) Int. Cl.
*F16C 11/00* (2006.01)

(52) U.S. Cl. ..................... 403/135; 403/122

(58) Field of Classification Search ........... 40/135; 403/122, 132, 134, 138, 141–144, 135; 384/206, 384/208, 209, 210
See application file for complete search history.

(56) References Cited

U.S. PATENT DOCUMENTS

| | | | |
|---|---|---|---|
| 2,274,420 A | | 2/1942 | Katcher |
| 2,553,743 A | * | 5/1951 | Booth ............... 403/36 |
| 2,635,906 A | * | 4/1953 | Graham et al. ........ 403/36 |
| 3,103,370 A | | 9/1963 | Krizman |
| 3,128,110 A | * | 4/1964 | Herbenar ............ 403/138 |
| 3,220,755 A | * | 11/1965 | Gottschald et al. ...... 403/136 |
| 3,951,557 A | * | 4/1976 | Herbenar ............ 403/138 |
| 4,076,344 A | * | 2/1978 | Gaines et al. .......... 384/213 |
| 4,615,638 A | | 10/1986 | Ito |
| 4,720,205 A | | 1/1988 | Ito |
| 4,871,276 A | | 10/1989 | Fister et al. ........... 403/162 |
| 5,112,153 A | | 5/1992 | Gunn et al. |
| 5,116,159 A | * | 5/1992 | Kern et al. ............ 403/132 |
| 5,496,125 A | | 3/1996 | Maughan |
| 5,564,853 A | * | 10/1996 | Maughan ............. 403/137 |
| 5,772,337 A | * | 6/1998 | Maughan et al. ........ 384/206 |
| 5,997,208 A | * | 12/1999 | Urbach et al. .......... 403/137 |

(Continued)

FOREIGN PATENT DOCUMENTS

EP    0342351 A1    11/1989

(Continued)

OTHER PUBLICATIONS

Federal-Mogul website—"MOOG Chassis Parts—M2 Technology"—Sep. 12, 2003—2 pages.

*Primary Examiner* — Daniel P Stodola
*Assistant Examiner* — Nahid Amiri
(74) *Attorney, Agent, or Firm* — Robert L. Stearns; Dickinson Wright PLLC

(57) ABSTRACT

An improved compression load ball joint assembly consisting of a metal housing having an open end and an internal cylindrical chamber which at least partially encloses a portion of a movable stud member, a lower metal bearing, an upper metal split bearing, and a Belleville washer. The upper metal split bearing is disposed opposite the lower metal bearing to engage the movable stud member and the housing simultaneously. The upper metal split bearing is configured to slide within the housing to provide for a constant wear surface against the movable stud member. The lower metal bearing, upper metal split bearing, Belleville washer, and movable stud member are contained within the housing by a cover plate concentrically disposed about the movable stud member and secured within the open end of the housing.

8 Claims, 2 Drawing Sheets

U.S. PATENT DOCUMENTS

| | | | | |
|---|---|---|---|---|
| 6,010,271 | A * | 1/2000 | Jackson et al. | 403/131 |
| 6,042,293 | A * | 3/2000 | Maughan | 403/135 |
| 6,371,682 | B1 * | 4/2002 | Maughan | 403/165 |
| 6,840,697 | B1 * | 1/2005 | Dorr | 403/138 |

FOREIGN PATENT DOCUMENTS

| | | |
|---|---|---|
| GB | 929873 | 6/1963 |
| JP | 53140870 U | 11/1978 |
| JP | 55019823 U | 2/1980 |

* cited by examiner

US 8,047,739 B2

METAL SPLIT BEARING COMPRESSION LOAD BALL JOINT

CROSS-REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates to ball joint bearings, and in particular, to an improved all metal compression load ball joint utilizing a split upper bearing configured to provide a bearing surface for the top and sides of a ball stud, and to allow full engagement of the bearing with the housing and the stud simultaneously.

Conventional ball joints, and other movable sockets are used, for example, in automotive steering and suspension applications, and can be divided into two categories. The first category is for use in follower and tension load applications in which the stud member of the ball joint experiences axial tension loads, while the second category is for use in compression load applications in which the stud member of the ball joint experiences axial compression loads. Due to the different axial loads on the stud member, different ball joint designs are required for each category, which are generally not interchangeable.

In general, ball and socket joints comprise a cylindrical housing having a cylindrical internal surface and an opening through which the shank portion of a stud member extends. A ball end portion of the stud member is contained in the housing, with one or more bearing members supporting the ball end portion within the housing. Traditionally, the bearing members are composed of a synthetic resin, such as a polymer or elastomer, or a sintered alloy. These components are installed into the housing through an opening, with the ball stud extending outward through an axially disposed opening which may either be the same opening through which the components were installed, or an axially opposite opening. Conventionally, tension load ball joints, such as the M2 Technology chassis parts available from the Moog Chassis Parts division of Federal Mogul Corporation, utilize two openings at opposite ends of the housing. After the components are installed therein, one opening is closed by means of a coverplate, spun, swaged, or welded in place, and the stud member extends outward through the opposite opening. Once secured in place, the cover-plate presses on the bearing members either directly or indirectly through a resilient rubber intermediate component.

In contrast, compression load ball joint housings, such as shown in U.S. Pat. No. 6,010,271 to Jackson et al., have only a single opening through which all the components are installed during assembly, and through which the stud member protrudes. These components include a compression spring, a polymeric lower bearing, the stud member, and a metal upper bearing. Once the components are in place, and the stud member shank is protruding from the opening, the peripheral edges of the opening are swagged or rolled to retain the components in place and compressing the spring.

Once assembled, ball joints and movable sockets may be utilized as load carrying members in numerous mechanical systems, including automotive vehicle suspension and steering systems. Movable sockets or ball-joints employed in these applications are subjected to various operating conditions, and may be required to carry substantial loads. When wear develops, particularly in polymeric bearings, the performance of the movable socket or ball-joint rapidly degrades and, in the case of automotive applications, may result in erratic steering or excessive looseness and play in the vehicle suspension system.

Accordingly, it is desirable to provide a compression load ball and socket joint having an improved resistance to wear.

BRIEF SUMMARY OF THE INVENTION

Briefly stated, the present invention provides an improved compression load ball joint assembly consisting of a metal housing having an open end and an internal cylindrical chamber which at least partially encloses a portion of a movable stud member. A lower metal bearing is enclosed by the housing within the internal cylindrical chamber and is disposed to engage the movable stud member. The lower bearing is retained against movement by an interference fit between an outer side surface of the lower bearing and an inner side surface and inner end surface of the housing. An upper metal split bearing is enclosed by the housing within the internal cylindrical chamber, concentric with the movable stud member. The upper metal split bearing is disposed opposite the lower metal bearing to engage the movable stud member and the housing simultaneously. The split upper bearing is configured to slide within the housing to provide for a constant wear surface against the movable stud member. A Belleville washer is concentrically disposed about the movable stud member to provide an axial load on the split upper bearing. The lower bearing, upper split bearing, Belleville washer, and movable stud member are contained within the housing by a cover plate concentrically disposed about the movable stud member and secured within the open end of the housing.

The foregoing and other objects, features, and advantages of the invention as well as presently preferred embodiments thereof will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings.

DESCRIPTION OF THE PREFERRED EMBODIMENT

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

Figure 1A:
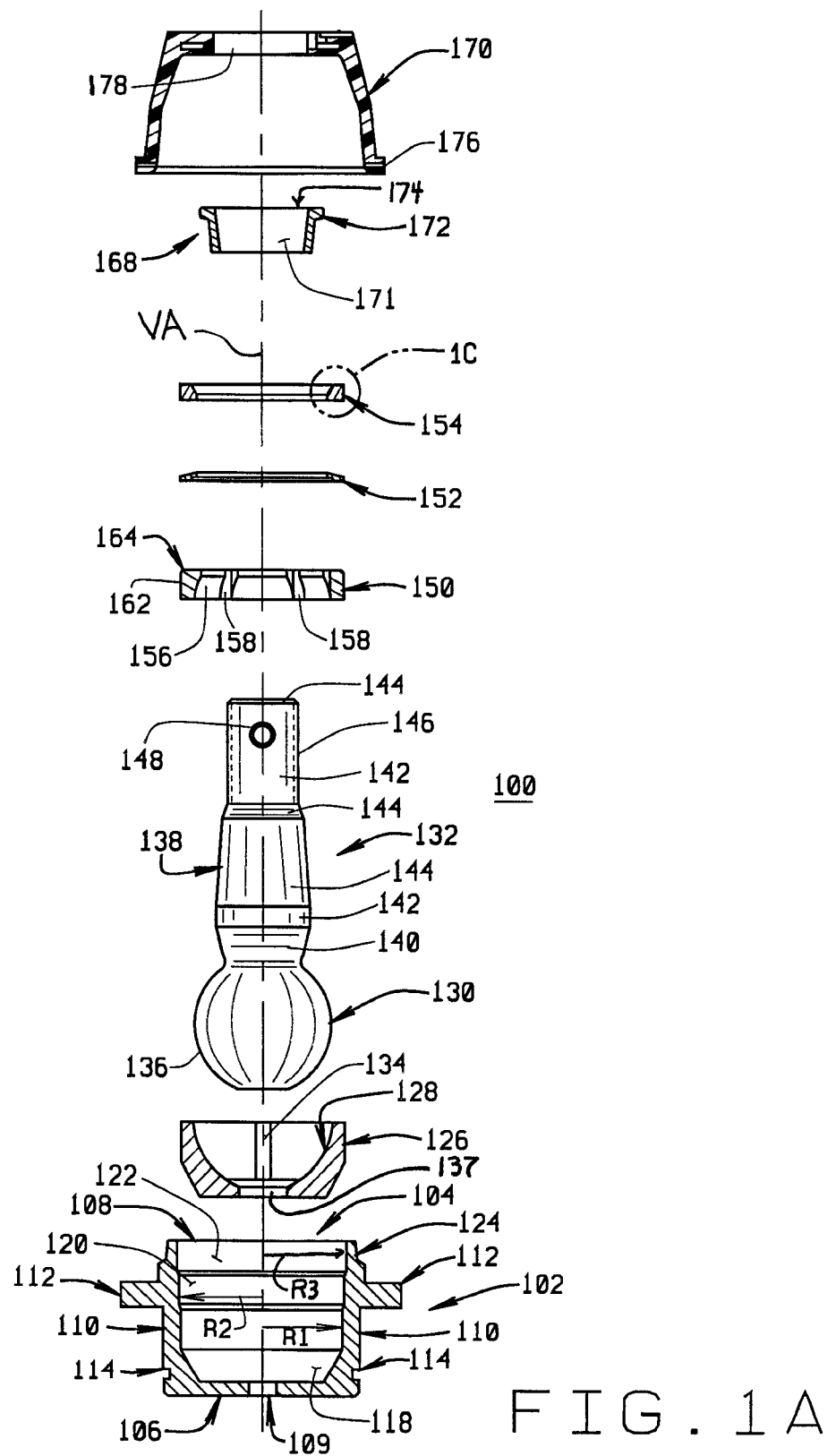
FIG. 1A is an exploded sectional view of an improved ball joint of the present invention.

Turning to FIG. 1A, a movable joint 100 of the present invention is shown in an exploded view. A metal housing 102, within which the various internal components of the movable joint 100 are enclosed, is generally cylindrical, with a central bore 104 defining a side wall having a closed lower end 106 and an open upper end 108. A lubrication or wear indicator passage 109 may be axially disposed in the closed lower end 106, providing access to the central bore 104 after assembly of the movable joint 100. The exterior surface 110 of housing 102 may follow the general contour of the central bore 104. In the embodiment illustrated, the exterior surface 110 further includes an annular flange 112 and a annular groove 114. The annular flange 112 and annular groove 114 are configured for attachment of movable joint 100 to other components (not shown). As may be appreciated, the annular flange 112 and annular groove 114 may be adapted for other specific kinds of installations employing threads or other connectors (not shown).

The central bore 104 of the housing 102 is generally cylindrical having a radius R1, and preferably includes truncated conical portion 118 adjacent the closed lower end 106. An upper bearing portion 120 of the central bore 104 is preferably provided with a increased radial dimension of R2, sized to receive a bearing component. Finally, a closure portion 122 of the central bore 104, adjacent the open upper end 108 is preferably provided with an increased radial dimension of R3, such that R1<R2≦R3. The closure portion 122 corresponds with a reduced-thickness deformable portion 124 of the housing 102 configured for swagging or rolling in a radially inward direction to enclose components within the central bore 104 after assembly.

To assemble the movable joint 100, a lower bearing 126 sized for an interference fit within the central bore 102 and truncated conical portion 118 is seated against the closed lower end 106. The lower bearing 126 is formed from metal, such as a sintered alloy, and includes a inner hemispherical surface 128 axially aligned with a vertical axis VA of the housing, and sized to receive a ball portion 130 of a metal movable stud member 132. The metal lower bearing 126 preferably includes one or more slots or grooves 134 disposed in the inner hemispherical surface 128. Slots 134 facilitate a flow of lubricant between the inner hemispherical bearing surface 128 and an outer surface 136 of the ball portion 130. The metal lower bearing 126 further includes an axial lubricant passage 137, aligned with the lubrication or wear indicator passage 109, through which lubricant can be delivered to the bearing surfaces.

As seen in FIG. 1A, the movable stud member 132 consists of the spherical head portion 130, and an elongated cylindrical shank portion 138. Those of ordinary skill in the art will recognize that the particular shape and configuration of the shank portion 138 may be varied depending upon the particular application for which the movable joint 100 is configured. For example, as shown in FIG. 1A, the shank portion 138 may include a reduced diameter neck portion 140 upon which the head portion 130 is formed, one or more constant radius segments 142, and one or more tapered segments 144. The shank portion 138 may further include one or more features designed to facilitate a connection to other components (not shown) which may include, but are not limited to, threads 146 and one or more bores 148.

Once the lower metal bearing 126 and movable stud member 132 are positioned in the central bore 104 during assembly, the remaining components of the movable joint 100 are installed. These include an annular metal upper bearing 150 configured to seat concentrically about the movable stud member 132, against the head portion 130 opposite from the lower metal bearing 126, a Belleville washer 152, and an annular cover plate 154.

Figure 1B:
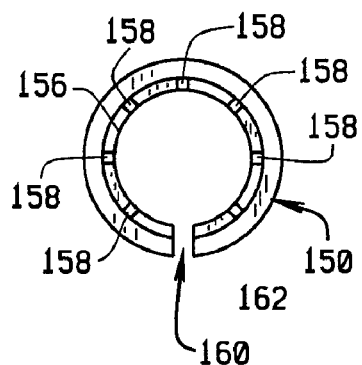
FIG. 1B is a top plan view of an annular upper metal split bearing component present in FIG. 1A.

The annular upper metal bearing 150 seats within the upper bearing portion 120 of the central bore 104, and provides an inner hemispherical wear surface 156 for the top and sides of the movable stud member head portion 130. As seen in FIG. 1B, the annular upper metal bearing 150 includes one or more lubrication slots 158, and a split 160 extending from the inner surface 156 to an exterior surface 162. The split 160 permits the annular upper metal bearing 150 to fully engagement the inner surface of the central bore 104 and the head portion 130 simultaneously, limiting movement of the movable stud member 132 when loaded in axial and radial directions. The upper metal bearing 150 is preferably sized to move axially within the central bore 104, providing a constant wear surface for the head portion 130, and providing axial and radial support during normal wear of the internal components of the movable joint 100.

Prior to installing the cover plate 154 in the central bore 104, the Belleville washer 152 is disposed about the movable stud member 132, and seated on an upper surface 164 of the annular upper metal bearing 150. The Belleville washer 152 or washer spring is configured to provide a preload on the assembled components of the movable joint 100, and to established a desired torque during assembly thereof. After assembly, the load provided by the Belleville washer 152 maintains the simultaneous contact between the upper metal bearing 150, the head portion 130, and the inner surface 120 of the central bore 104.

Figure 1C:
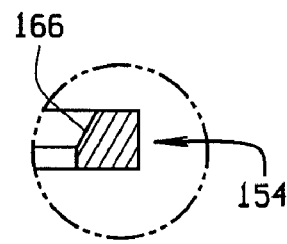
FIG. 1C is an enlargement of a portion of FIG. 1A, illustrating a cover plate orientation.

To complete the assembly of the components within the housing 102, the annular cover plate 154 is disposed about the movable stud member 132, and positioned within the central bore 104. The reduced-thickness deformable portion 124 of the housing 102 is then swagging or rolling in a radially inward direction to capture the cover plate 154 and enclose components within the central bore 104. During the swagging or rolling processes, the Belleville washer 152 is compressed between the cover plate 154 and the upper surface 164 of the upper metal bearing 150, establishing the desired preload force on the housing internal components. Preferably, as shown in FIG. 1C, the cover plate 154 includes a chamfered inner surface 166. The surface 166 provides clearance for the movable stud member 132 during articulation within the housing 102.

Figure 2:
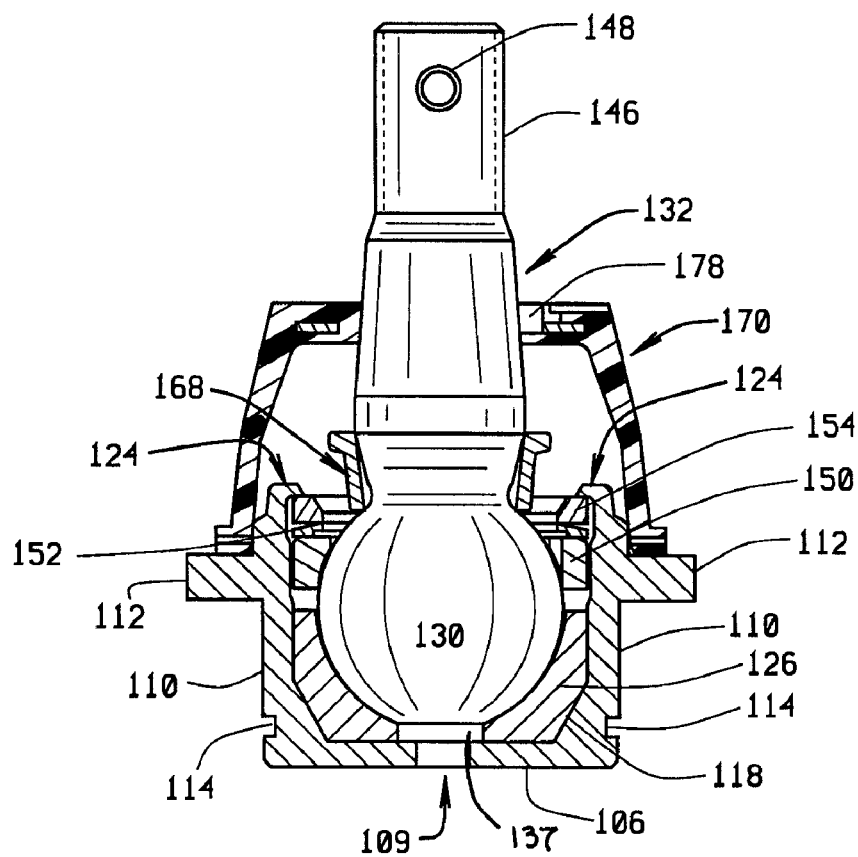
FIG. 2 is an assembled sectional view of the ball joint of FIG. 1A.

As illustrated in FIGS. 1A and 2, a restrictor 168 and a dust cover 170 may optionally be installed about the movable stud member 132. The restrictor 168 consists of a tubular body 171 having an annular region 172 of increased thickness adjacent an upper end 174. When the restrictor 168 is disposed about the neck portion 140 of the stud member 132, the annular region 172 and body 174 of the restrictor 168 act to limit the range of articulation of the stud member 132 by contacting the swagged or rolled deformation portion 124 of the housing 102.

The dust cover 170 is preferably formed from a flexible rubber or other elastomeric material, and is secured to the exterior of the housing 102 by a snap-ring 176 disposed within the dust cover itself, or other conventional retaining member the movable stud member 132 passes through a fitted 178 opening in the top of the dust cover 170, exposing a portion of the stud member 132 for coupling to other components (not shown), such as a vehicle suspension.

Those skilled in the art will readily recognize that a variety of shapes and configurations for housing 102 and movable stud member 132 are possible, together with associated configurations of bearings 126 and 150, depending upon the particular application for which the movable joint 100 is intended. For example, the stud 132 may include a hemispherical or cylindrical head, or the cylindrical body may include threads 146, bores as at 148, or grooves for attachment of external components (not shown).

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

The invention claimed is:

1. A moveable joint comprising:
   a metal housing having a side wall which defines a central bore having a closed end and an open end, said metal housing having an axial lubrication port disposed in said closed end of said central bore;
   a metal lower bearing disposed within said central bore adjacent said closed end, said metal lower bearing including a lubrication slot disposed on an inner bearing surface, said lubrication slot being generally axially aligned with said central lubrication port in said metal housing to provide a common lubrication passageway;
   a metal moveable member having a head end portion disposed in said central bore and a shank portion extending from said head end portion, said head end portion engaging said metal lower bearing in said central bore, said shank portion being at least partially disposed outside of said central bore, said head end portion further including a flat spot in direct facing opposition to said lubrication slot of said metal lower bearing;
   a one-piece annular metal upper bearing disposed about said moveable member within said central bore adjacent said open end, said annular metal upper bearing having an inner surface engaging said head end portion in direct metal-to-metal sliding contact, an outer surface directly engaging said side wall, and a split segment extending from said inner surface to said outer surface establishing two opposing free ends and thereby providing a degree of circumferential flexibility to said annular metal upper bearing;
   an annular cover plate including a chamfered inner surface, said annular cover plate disposed about said moveable member and secured within said central bore adjacent said open end; and
   a spring member compressed between said annular cover plate and an upper surface of said annular metal upper bearing.

2. The moveable joint of claim 1 wherein said annular cover plate and said spring member are composed of metal.

3. The moveable joint of claim 1 wherein said spring member is configured to exert an axial preload force on said annular metal upper bearing towards said closed end of said central bore; and
   wherein said annular metal upper bearing is configured to engage said side wall and said head end portion simultaneously.

4. The moveable joint of claim 1 wherein said annular metal upper bearing is axially displaceable within said central bore.

5. The moveable joint of claim 1 wherein said metal lower bearing is retained with said central bore by an interference fit.

6. The moveable joint of claim 1 further including a dust boot restrictor disposed about said shank portion.

7. The moveable joint of claim 1 further including a flexible dust cover coupled between said housing and said shank portion of said moveable member.

8. The moveable joint of claim 1 wherein said housing includes a deformable annular region adjacent said open end of said central bore, said deformable annular region adapted for radially inward deformation to secure said annular cover plate within said central bore.

* * * * *